US011631068B1

(12) United States Patent
Krebs et al.

(10) Patent No.: US 11,631,068 B1
(45) Date of Patent: Apr. 18, 2023

(54) KIOSK SECURITY SYSTEM

(71) Applicant: UIPCO, LLC, San Antonio, TX (US)

(72) Inventors: Emily Kathleen Krebs, San Antonio, TX (US); Stacy Callaway Huggar, San Antonio, TX (US); Jeffrey Neal Pollack, San Antonio, TX (US); Yevgeniy Viatcheslavovich Khmelev, San Antonio, TX (US); Mark Anthony Lopez, Helotes, TX (US); Ryan Thomas Russell, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 328 days.

(21) Appl. No.: 16/799,615

(22) Filed: Feb. 24, 2020

Related U.S. Application Data (60) Provisional application No. 62/810,644, filed on Feb. 26, 2019.

(51) Int. Cl.
| | |
|---|---|
| *G06Q 20/00* | (2012.01) |
| *G06Q 40/00* | (2012.01) |
| *G06Q 20/10* | (2012.01) |
| *G07F 19/00* | (2006.01) |
| *G06F 21/83* | (2013.01) |
| *G06V 40/20* | (2022.01) |

(52) U.S. Cl.
CPC ......... *G06Q 20/1085* (2013.01); *G06F 21/83* (2013.01); *G06V 40/28* (2022.01); *G07F 19/2055* (2013.01)

(58) Field of Classification Search
CPC .... G06Q 20/1085; G06V 40/28; G06F 21/83; G07F 19/2055
USPC ...................................... 705/35–45
See application file for complete search history.

(56) References Cited

U.S. PATENT DOCUMENTS

| | | | |
|---|---|---|---|
| 6,694,058 B1 * | 2/2004 | Burchart ............ | G06Q 20/1085 382/209 |
| 6,731,778 B1 * | 5/2004 | Oda ..................... | H04N 5/2254 396/326 |
| 2002/0186886 A1 * | 12/2002 | Rhoads ................. | G06T 1/0057 704/E19.009 |
| 2004/0215564 A1 * | 10/2004 | Lawlor ................. | H04M 17/02 705/40 |
| 2008/0159588 A1 * | 7/2008 | Rhoads ............ | G11B 20/00166 707/E17.112 |

(Continued)

OTHER PUBLICATIONS

Dialog NPL (non-patent literature) Search, dated Mar. 11, 2022. (Year: 2022).*

(Continued)

*Primary Examiner* — Hai Tran
(74) *Attorney, Agent, or Firm* — Perkins Coie LLP (57) ABSTRACT

Image processing techniques can be used to determine whether a person has installed an unauthorized device on or in a kiosk. For example, an image processing server can determine whether a person's hand(s) are engaging in abnormal behavior by obtaining recorded images of the person's hand(s) that extend towards the kiosk to perform an action, and by comparing the information in the recorded images with a set of previously known information about other persons' hands that are similarly extended towards the kiosk.

18 Claims, 10 Drawing Sheets

(56) References Cited

U.S. PATENT DOCUMENTS

2011/0158468 A1* 6/2011 Rhoads .............. H04N 1/00037
382/100

OTHER PUBLICATIONS

Google NPL (non-patent literature) Search, dated Mar. 11, 2022. (Year: 2022).*

* cited by examiner

KIOSK SECURITY SYSTEM

CROSS-REFERENCE TO RELATED APPLICATIONS

This application is a non-provisional of and claims priority to U.S. Provisional Application No. 62/810,644, filed on Feb. 26, 2019, entitled "KIOSK SECURITY SYSTEM," which is hereby incorporated by reference in its entirety for all purposes.

BACKGROUND

An interactive kiosk includes a computer with software that allows a user to perform operations relevant to the user's needs in a variety of contexts. For example, a kiosk located in a shopping mall may allow a user to obtain directions. In another example, a user may walk up to an automated teller machine (ATM) and perform transactions with his or her financial institution. While kiosks can be used in different contexts for different needs, kiosks used for one type of application may require a level of security not required by kiosks used for another type of application. For example, an ATM may require a user to input a passcode on a keypad and to insert his or her electronic card in a scanner before the ATM allows the user to perform a transaction. However, hi-tech thieves have conceived of devices that can be placed on top of keypads or in front of a card scanner to steal a user's passcode and/or electronic card information.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Kiosks used for financial transactions are susceptible to tampering. For example, in an ATM, a thief can place a device known as a skimmer in front of the electronic card scanner to steal a user's electronic card information. A skimmer can scan the magnetic strip on a user's electronic card as the user inserts his or her card in the card scanner. With the advent of newer electronic cards with computer chips, enterprising thieves have devised another device known as a shimmer to steal information from the computer chip on the electronic card. In many instances, a skimmer or shimmer matches the color scheme and/or the texture of the actual card scanner to deceive the user into thinking that he or she is performing a secure transaction. As a result, thieves may use glue or tape these unauthorized devices over an actual card slot on a kiosk. In another example of kiosk tampering, a thief may place wireless cameras on or in a kiosk to record a user entering his or her passcode on a keypad.

This patent document describes image processing techniques to determine whether a person has tampered with a kiosk. Information about kiosk tampering can be sent to an entity that owns or uses the kiosk (e.g., a bank) to enable the entity to take security measures to protect its customers from theft. In an embodiment, a kiosk may include a camera that can record a set of still or moving images of a person located in an area in front of the kiosk. The images recorded by the camera can include one or more hands of the person as the person performs an action in front of the kiosk. The performed action may be authorized (e.g., entering a passcode using the keypad or inserting an electronic card in the card scanner), or the performed action may be unauthorized (e.g., a person installing a shimmer device or skimmer device or camera on the kiosk). Some examples of a kiosk include an automated teller machine (ATM) or a gas station fuel dispenser.

Figure 1:
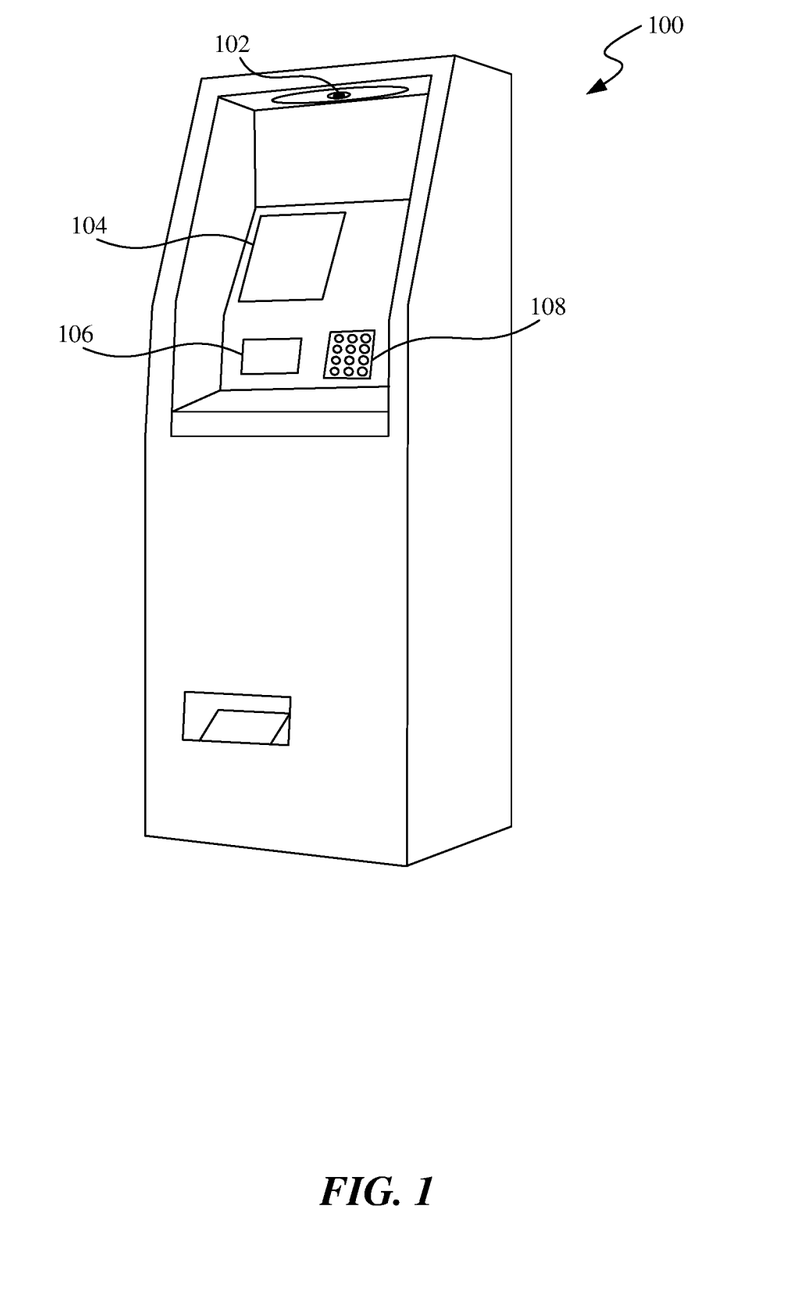
FIG. 1 shows an example of a design of a kiosk that obtains images used to determine whether a person has tampered with the kiosk.

FIG. 1 shows an example of a kiosk 100 that obtains images used to determine whether a person has tampered with the kiosk. The kiosk 100 includes a display 104 that displays information to a person visiting the kiosk. The kiosk 100 also includes keypad 108 that may be used to enter a person's passcode or postal zip code when prompted by the display 104. The card reader 106 in the kiosk 100 can receive and scan an electronic card from the person. The card reader 106 may scan the magnetic strip on the electronic card, or the computer chip on the electronic card, or both. A computer (not shown in FIG. 1) may be installed in the kiosk 100 and may execute software related to the application for which the kiosk is designed. For example, if the kiosk is an ATM, the computer software may display using the display 104 information to the person visiting the kiosk to enter his or her passcode, the computer software may also receive information from the card reader 106 and/or the keypad 108 to perform authentication or security checks.

The kiosk 100 also includes a camera 102 that is positioned to record a plurality of images of a person located in an area in front of the kiosk 100. As shown in FIG. 1, the camera 102 may be positioned on top of the kiosk and pointing down to record images (e.g., still or moving images) of one or more hands of a person that perform an action in front of the kiosk 100. Some examples of an action performed in front of the kiosk 100 include a person entering a passcode using the keypad 108, inserting an electronic card using the card reader 106, withdrawing cash, depositing a cash or check, or installing an unauthorized device (e.g., shimmer, skimmer, or additional camera(s)) on the kiosk 100. The camera 102 is positioned on the kiosk in a way that allows the camera 102 to record images as a person performs action(s) with respect to the card reader 106, the keypad 108, or the chassis of the kiosk 100. Thus, in some embodiments, the camera 102 is positioned above the card reader 106 or the keypad 108 so that the field of view of the camera 102 captures the images needed for the image processing techniques described in this patent document. In some embodiments, the camera 102 can be placed next to the display 104 and pointing at an angle to record images as a person in front of the kiosk 100.

Figure 2:
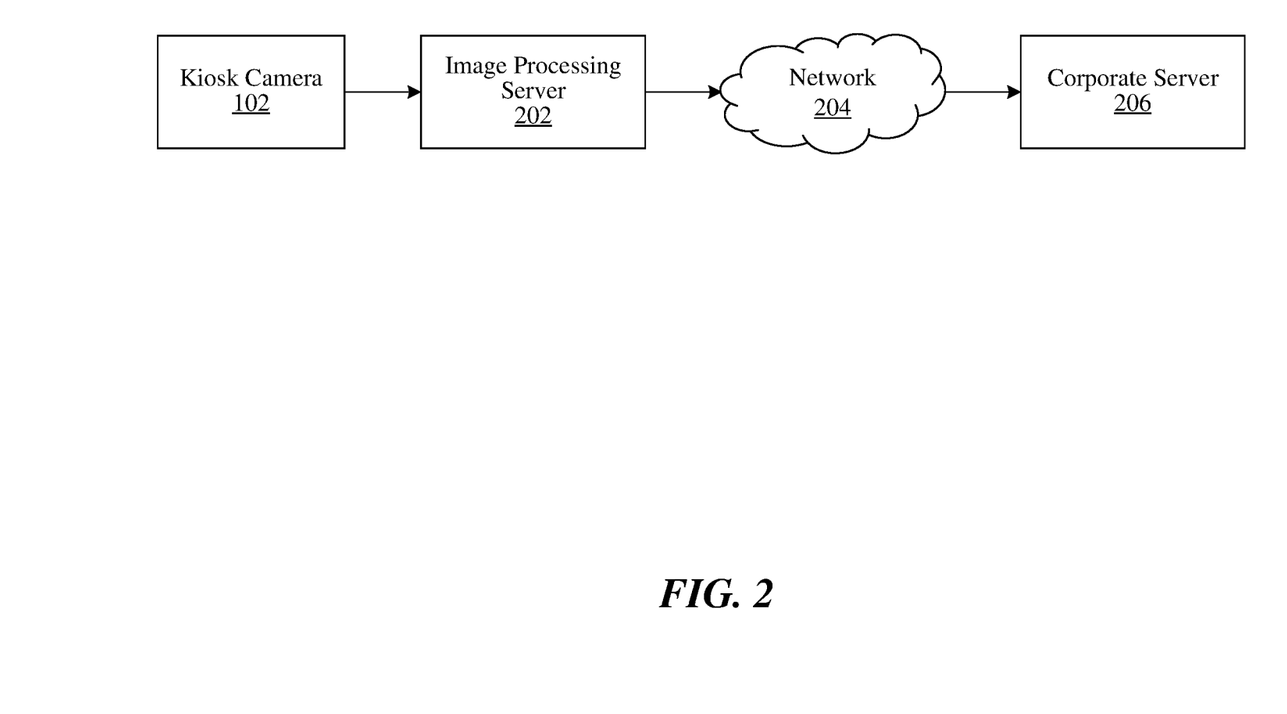
FIG. 2 shows an example of a block diagram of a system used to perform image processing to determine whether a person is performing an authorized or an unauthorized action.

FIG. 2 shows an example of a block diagram of a system used to perform image processing to determine whether a person is performing an authorized or an unauthorized action. the system includes the kiosk camera 102 (as described in FIG. 1) sending the recorded images to the image processing server 202. The image processing server 202 receives and performs image processing on the recorded images to determine whether a person located in front of the kiosk is performing an authorized or an unauthorized action. From the recorded images, the image processing server 202 identifies a subset of one or more images that include the one or more hands of a person that extend towards the keypad or the card reader. In some embodiments, the image processing server 202 identifies the images that includes the hand(s) of a person by comparing at least one recorded image to a previously stored image recorded by the camera that does not include a person in front of the kiosk. The image processing server 202 may use, for example, an image subtraction technique to remove the kiosk and/or background image included in the camera's field of view from the at least one recorded image to obtain an image and/or an outline of a person located in front of the kiosk.

In some of the recorded images, the image processing server 202 may determine that the obtained image and/or outline of the person includes one or more areas that contain the one or more hands of the person. As mentioned above, a person in front of the kiosk may perform an action by extending one or more hands towards the keypad or the card reader. The image processing server 202 may identify the area(s) on the image that include the extended hand(s). In some embodiments, the area identified by the image processing server 202 may be a group of pixels on the image that include the extended hand.

Figure 3A:
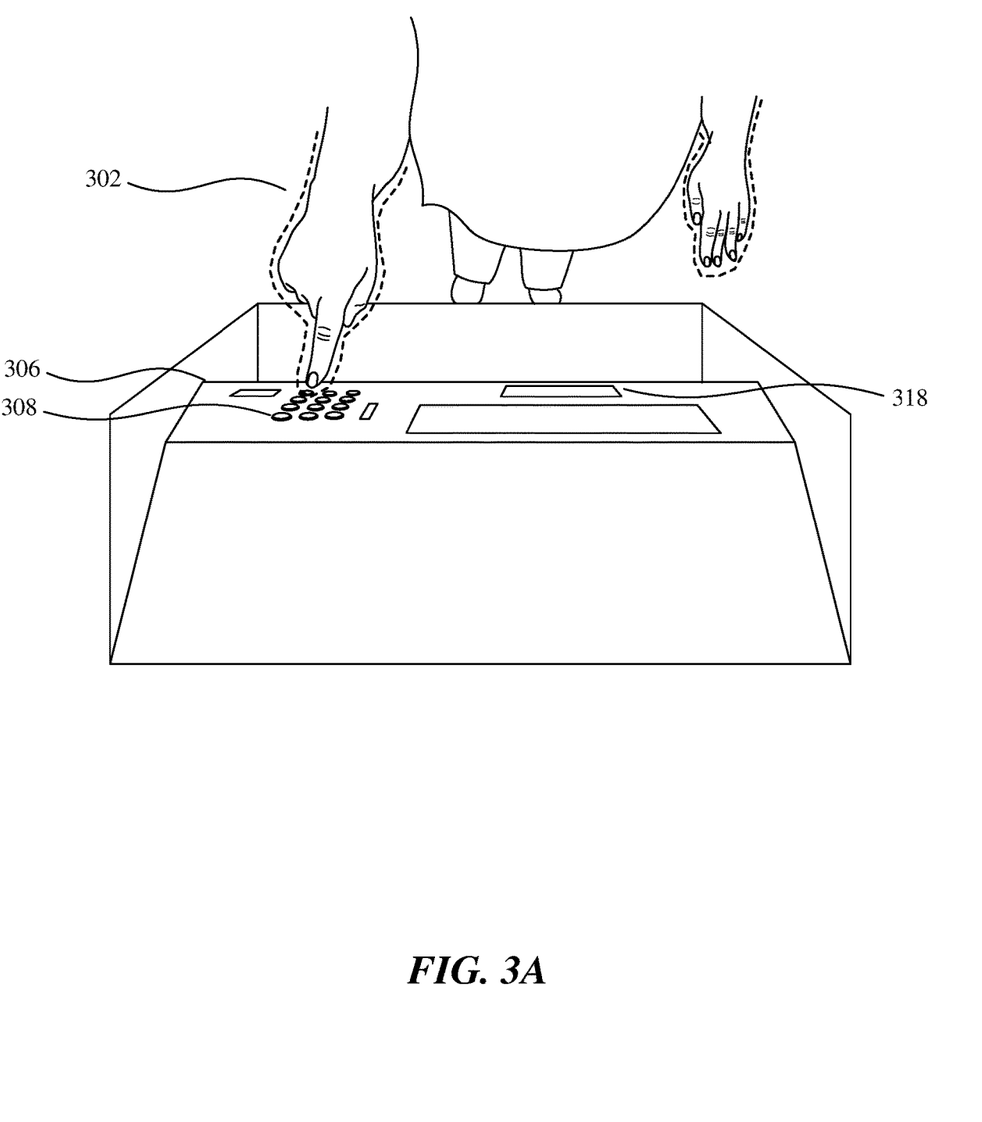
FIGS. 3A-3B show examples of the image processing performed by an image processing server to determine whether a person is performing an authorized or an unauthorized action.
Figure 3B:
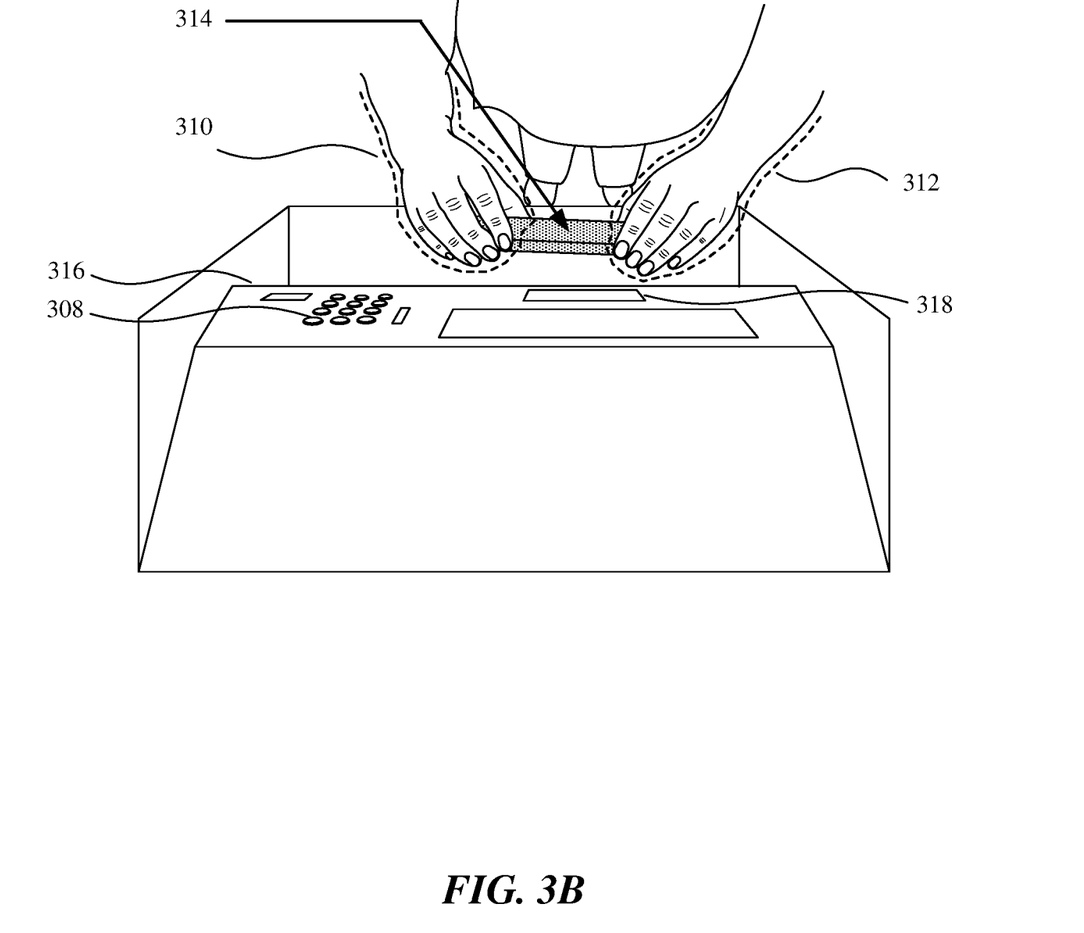

FIGS. 3A and 3B shows two example scenarios where a person is extending his or her hand(s) towards the kiosk to perform an action. In FIG. 3A, the person is entering his or her passcode using the keypad 308, and in FIG. 3B, the person is trying to install an unauthorized device 314 (e.g., shimmer or skimmer device) on a card reader 318. Using the example techniques described in this patent document, the image processing server 202 can receive an image of the persons in FIG. 3A or 3B from a camera, and the image processing server 202 can determine one or more areas (302, 304 in FIGS. 3A and 310, 312 in FIG. 3B) occupied by a person's hand(s) in the received image. In some embodiments, the image processing server 202 may determine that a received image includes a single area where a person has extended one of his or her hands towards the kiosk. In some embodiments, the image processing server 202 may determine that one or more hands of a person are extended towards the kiosk by determining a shortest distance from the one or more areas occupied by the person's hands and a location on the image associated with the kiosk (e.g., an edge of the front plate of the kiosk, shown as 306 in FIGS. 3A and 316 in FIG. 3B) and by determining that the shortest distance calculated is less than a pre-determined value.

The image processing server 202 can compare the one or more areas of the person's hand(s) (302, 304 in FIGS. 3A and 310, 312 in FIG. 3B) that extend towards the kiosk with a set of previously known areas of other persons' hands extended towards the keypad or the card reader. The set of set of previously known areas can be determined by the image processing server 202 to be associated with normal behavior by employing machine learning technology. Thus, the image processing server 202 may collect and processing various information related to normal behavior from persons who visited the kiosk and who may have performed an action or set of actions similar to the action(s) shown in FIG. 3A. In some embodiments, the previously processed information can be specific to a particular person (e.g., if a person inserts a card into the kiosk, the previously processed images can be specific to the individual who owns or is authorized to use the card). As an example, the image processing server 202 may store images and/or information related to areas generally occupied by other persons' hand(s) engaged in normal behavior in front of the kiosk, such as persons who performed action(s) similar to the action(s) shown in FIG. 3A. The image processing server 202 can also store information related to the length of time (or the number of images) when other persons' hands occupied areas near the keypad or the card scanner.

In some embodiments, the image processing server 202 can compare the one or more areas of the person's hand(s) that extend towards the kiosk with a set of previously known areas of other persons' hands at the same time. For example, the kiosk may include a proximity sensor that can sense when a person extends his or her hand(s) towards the keypad or the card scanner. Using this information, the image processing server 202 may compare the one or more areas of the person's hand(s) extending towards the kiosk at the same time as when other persons have extended their hands towards the kiosk, where the areas occupied by the other persons' hands are associated with normal behavior.

By comparing the images of one or more areas of a person's hand(s) with a set of images or information of previously known areas of other persons' hands, the image processing server can determine that the one or more hands engaged in abnormal behavior. For example, the image processing server 202 may, based on the comparison, determine that a person is engaging in abnormal behavior if at least one hand of the person is extended towards the keypad or the card reader for more than a pre-determined number of images or more than a pre-determined length of time. Or in another example, if a person typically covers the keypad with a wallet or their other hand when inputting a PIN and that behavior occurs, such behavior can be used to determine that the user is not engaging in abnormal behavior. As mentioned above, the image processing server 202 can, based on an analysis of persons who have previously visited the kiosk, determine an average length of time or an average number of images when the persons have extended their hands towards the keypad or card reader. This average information may be used by the image processing server 202 to determine when a person's hands are extending in front of the kiosk for an abnormal duration of time. In some embodiments, if the images of the set of previously known areas of the person's hands are of the owner of a card, then additional attributes of the person can be analyzed for authentication purposes. For example, the amount of pressure applied by the user on the keypad can be analyzed, as well as how quickly credentials such as a PIN were typed in the keypad. In some embodiments, the images can be analyzed in combination with the pattern analysis to determine whether the user is tampering with the kiosk or simply trying to complete a transaction. Such analysis can reduce false positives. For example, should the pattern analysis detect potentially bad behavior, a review of the actual images can be used to determine whether the behavior is in fact legitimate.

In another example, the image processing server 202 can determine whether a person is engaging in abnormal behavior by comparing a pattern of movement of a person's hands with a set of previously known movement patterns associated with normal behavior. The set of previously known movement patterns are obtained from the set of previously known areas of other persons' hands. The image processing server 202 may store the set of previously known movement patterns considered to be normal behavior by analyzing the set of previous known areas from a set of previously recorded images. Based on such analysis, the image processing server 202 may obtain a set of previously known movement patterns between the multiple image, where the set of previously known movement patterns describe the movement of other persons' hands considered normal behavior in front of the kiosk. For example, previous images capturing the user covering the keypad in a certain way can be compared to current activity. Such additional analysis can eliminate false positives.

In some embodiments, in response to the image processing server 202 determining that the one or more hands of a person in front of the kiosk are engaged in abnormal behavior, the image processing server 202 can also determine that an unauthorized device is installed or placed on or in the kiosk. For example, the image processing server 202 can determine that an unauthorized device is installed or placed by comparing of an image from the recorded images to a previously stored image of the kiosk. The image processing server 202 may use, for example, an image subtraction technique to determine whether a shape of the kiosk has changed. If the image processing server 202 determines that a kiosk shape or light pattern has changed, then it can determine that an unauthorized device is installed or placed on or in the kiosk.

In response to the image processing server 202 determining that one or more hands of a person is engaged in abnormal behavior, the image processing server 202 can generate and send a message to a corporate server 206 via the network 204 (e.g., the Internet), where the message indicates that the kiosk has been tampered with. The corporate server 206 can perform a safety measure in response to receiving the message from the image processing server 202. In some embodiments, the safety measure can include sending a second message to the kiosk to prevent additional transactions with the kiosk or sending to a computer a message that informs another person to inspect the kiosk.

The image processing serer 202 can determine, based on the comparison with a set of previously known areas of other persons' hands, that the one or more hands of a person in front of the kiosk is engaged in normal behavior. Such information can be used by corporate server 206 to authenticate the user in whole or in part, allowing the user to partake in transactions at the kiosk.

In some embodiments, a time stamp of nefarious activities at the kiosk can be recorded and used to establish patterns. During time frames (e.g., 12:00 am-4:00 am on Fridays) that tend to have higher rates of nefarious activity, the kiosk can enter into a high alert state, in essence adjusting the sensitivity (e.g., a behavior pattern analysis during a non-high crime time may not trigger an alarm but the same behavior pattern analysis during a high crime time may trigger an alarm). That is, a pattern of times in which a likelihood of criminal activity is higher than a predefined threshold can be established. The system can then set a lower threshold for determining abnormal activity during the times that the likelihood of criminal activity exceeds the threshold. Also, to assist with data processing and storage allocations, additional data storage space can be allocated for the times in which the likelihood of criminal activity is higher than the threshold. For example, if storage is running low, the system may not record or record at a lower rate during non-high crime times.

Figure 3C:
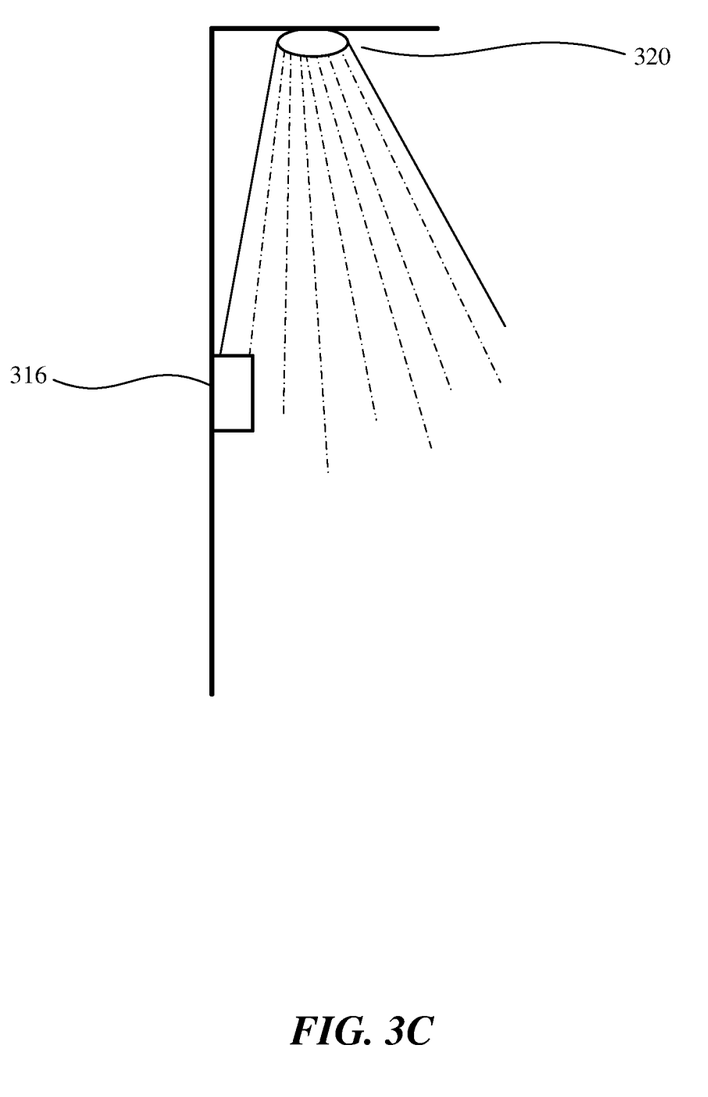
FIGS. 3C and 3D show a field of view of the kiosk camera and a camera view of the kiosk camera, respectively.
Figure 3D:
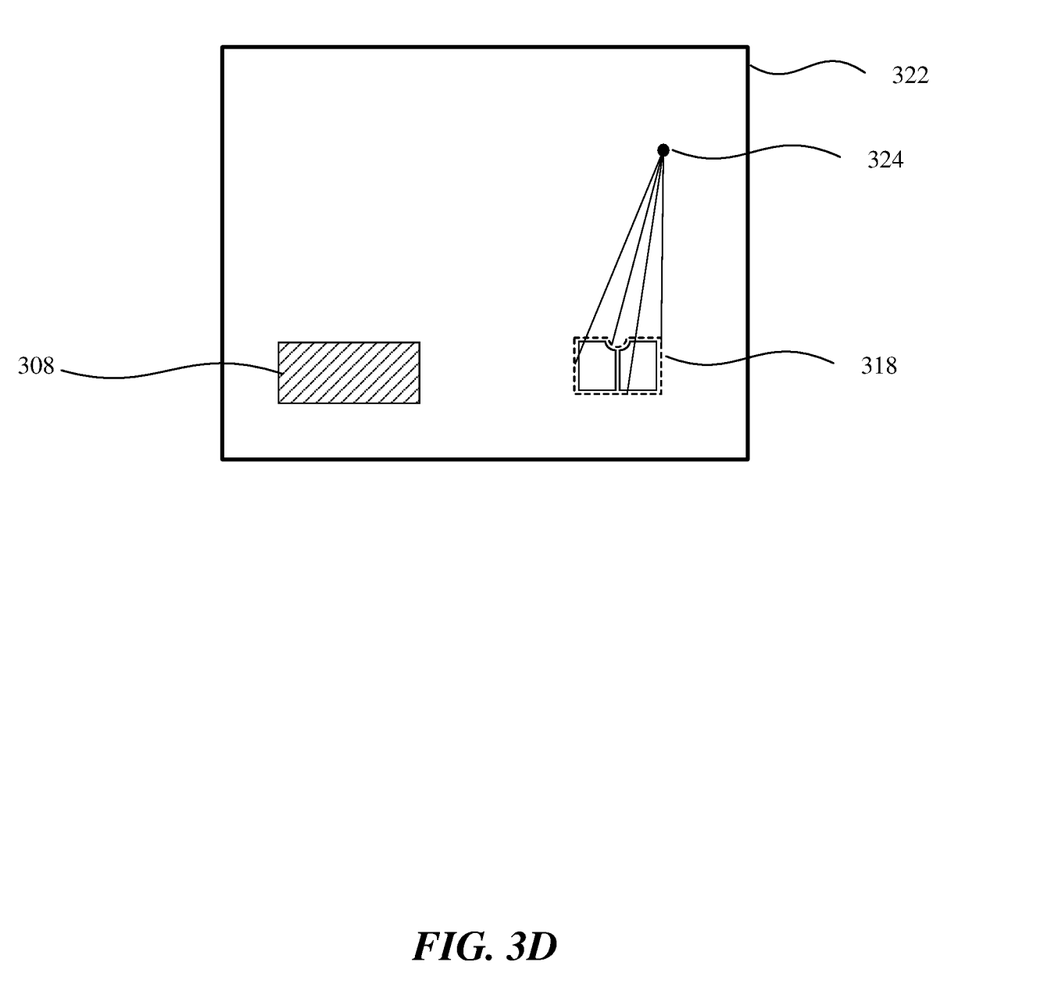

FIGS. 3C and 3D show a field of view of the kiosk camera and a camera view of the kiosk camera, respectively. FIG. 3C shows a field of view of a kiosk camera 320, where the kiosk camera's field of view includes the front panel 316 of the kiosk. As mentioned above, the front panel 316 may include a card reader and a keypad. FIG. 3D shows an image 322 obtained by the kiosk camera. The obtained image can include an area associated with a keypad 308 and another area associated with a card reader 318. In areas on the image 322 not occupied by the keypad 308 and card reader 318 may include other image content, such as a person or hands of a person, etc., The keypad 308 may be shielded so that the camera may not record a person's passcode.

Figure 3E:
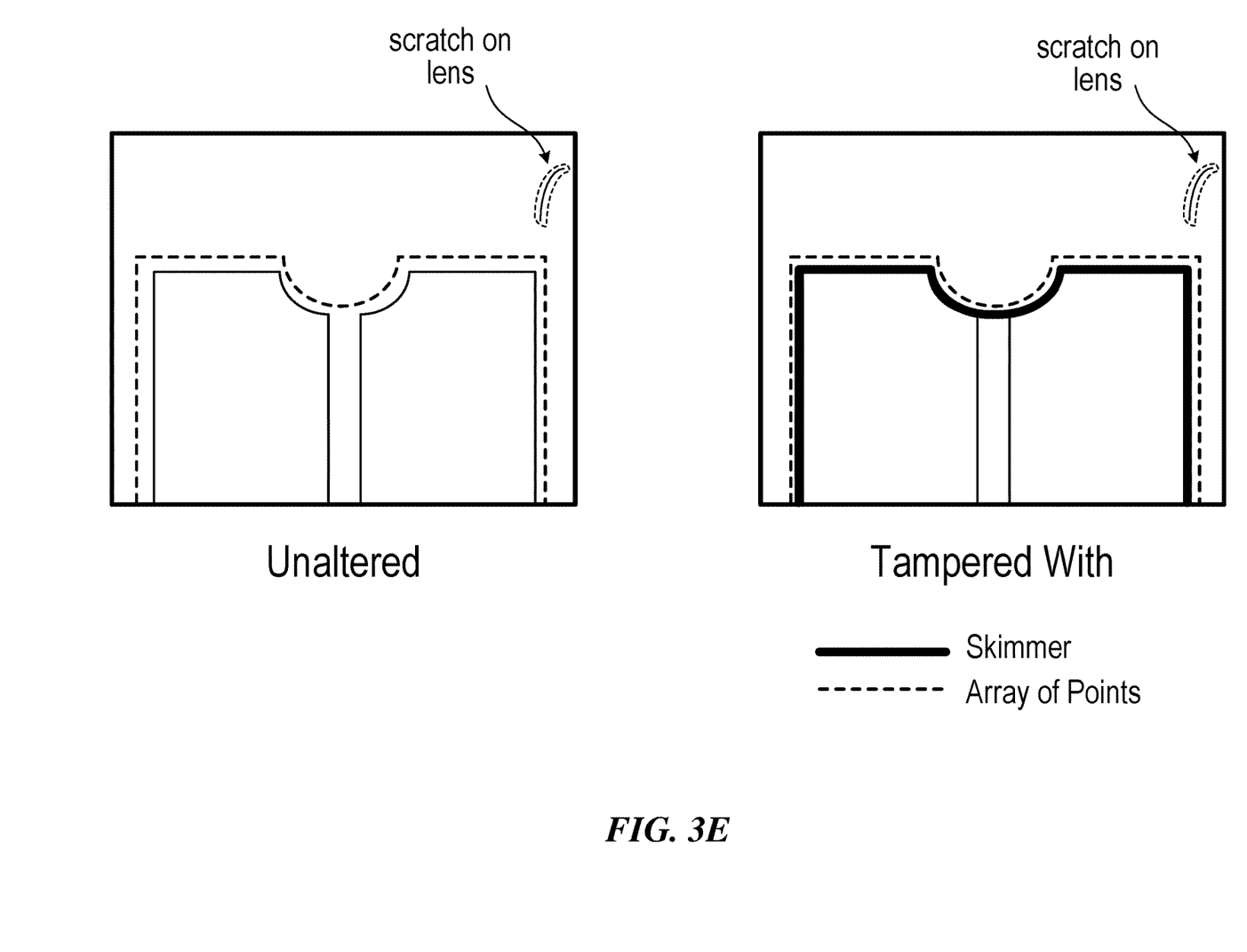
FIG. 3E shows an enlarged image of a keypad area where an example image processing technique is used to determine whether an unauthorized device has been installed on a kiosk.

FIG. 3E shows an enlarged image of a keypad area where an example image processing technique is used to determine whether an unauthorized device has been installed on a kiosk. A kiosk camera can obtain an image that includes the image of the keypad area as shown in FIG. 3E. Using the image received from the kiosk camera, an image processing server may determine a location of a card reader and may use an array of points (or pixels) around the card reader area for reference (shown in dashed line in FIG. 3E). In some embodiments, an area associated with the location of a card reader may be previously stored on the image processing server by a person (e.g., a technician or maintenance worker). Using the array or set of points, the image processing server may obtain a shape of a card reader and can thus determine a presence of an unauthorized device on top of or in front of the card reader. For example, on the left-side of FIG. 3E shows an unaltered enlarged image of the keypad area where an image processing server can determine a first array of points associated with an outline of the card reader. The right-side of FIG. 3E shows an enlarged image of a card reader on a kiosk that has been tampered with where an unauthorized device (e.g., skimmer device or shimmer device) has been attached to the card reader. The image processing server can determine that a kiosk has been tampered with by comparing a second array of points associated with an outline of the card reader and the unauthorized device. By determining that the two arrays of points are different in location or are related to or comprise different pixels or describe different areas, the image processing server can determine that an unauthorized device has been installed and can send a message to the corporate server to perform safety measure(s) as described in this patent document.

In some embodiments, an image processing server can perform image processing techniques described in this patent document even if an image from a kiosk camera may be distorted due to imperfections (e.g., dust or debris) or defects (e.g., scratch shown in FIG. 3E) on or in the kiosk camera's lens. In such embodiments, an image processing server can determine whether there is dust, debris, or defects on the kiosk camera's lens by determining a number of points from the array of points that have changed as compared to another array of points from previous image so that if the image processing server determines that the number of changed points is higher than a threshold value, the image processing server can determine that an unauthorized device may be placed on the kiosk. In some embodiments, the image processing server may compare locations associated with points from a first array of points from a first image to locations associated with the corresponding points from a second array of points from a second previous image. In some embodiments, two points from two arrays of points may correspond to each other if each of the two points characterizes a same position (e.g., a midpoint) on one side of the card reader. If the image processing server determine that an unauthorized device has been installed, the image processing server can send a message to the corporate server to perform safety measure(s) as described in this patent document. This design may be optionally recalibrated during maintenance intervals, at which point maintenance technicians or operators may check the kiosk for evidence of tampering, and if none is found then setting the image processing server to learn the shape of its parts so that the above described detections may occur.

The image processing server can determine the array of points on an image obtained from the kiosk camera (as shown in FIGS. 3D and 3E), which can be repeatedly determined again. Using the array of points, the image processing server can determine the presence of scratches, or can determine angles (e.g., the point at which the card receptacle has an angle to begin the curve in for the finger slot), or any other deterministic method. The image processing server can obtain the location of the array of points (e.g.: pixel location or a method of finding a device, or some combination thereof). The image processing server can analyze images to measure the location of the array of points over time to determine whether the array of points have changed or do not match compared to previous image(s).

As shown in FIG. 3D, in some embodiments, the image processing server may draw one or more lines from each array point within a region on an image to one or more other array points on the image. For example, the image processing server may determine an area on an image associated with of a card reader 318, and the image processing server can draw one set of lines from the area around the card reader 318 to another point on the image (e.g., a randomly selected location on the image) that may be considered a reference point. The image processing server can calculate the line formulas (e.g., slope, starting point, or ending point) and/or distances of one or more lines. The image processing server can store the line formulas or distances and then perform the same type of measurement with the same reference point over time to determine if the line formula or distance associated with at least some of the one or more lines have changed. For example, the image processing server can determine a first and second sets of points from two images, and the image processing server can obtain a first and second sets of distances by comparing at least some of the corresponding first and second sets of points to a reference points. If at least one distance from first set of distances is different from at least one corresponding distance from the second set of points, then the image processing server can determine that the lines that begin or terminate around the card reader area have changed. Accordingly, the image processing server can determine that an unauthorized device has been placed on the kiosk, and the image processing server can send a message to the corporate server to perform safety measure(s) as described in this patent document.

In some embodiments, the image processing server can use image obtained by the kiosk camera (shown in FIG. 3D) that captures the field of view of the kiosk camera (as shown in FIG. 3C) to determine if the obtained image has some reason(s) (e.g., around a card reader) that has changed relative to the same region(s) in a previous image. Such an embodiment may be beneficial since it would require less computation than the above described techniques and may be better for low bandwidth or high latency environments. In some embodiments, the image processing server may identify an area of the card reader or keypad compared to the area of the rest of the image. In such embodiments, if the image processing server determines that there is a change of the ratio of the two areas, then the image processing server can determine that an unauthorized device has been added to the kiosk.

In some embodiments, the system can isolate the image or series of images putting the system into high alert and automatically save the image or series of images to support legal action and/or to retrain an algorithm.

As shown in FIG. 2, the camera 102 and image processing server 202 may be physically connected using, for example, an ethernet or USB cable. In some other embodiments, the camera 102 may send the recorded images to the image processing server 202 via the network 204. In some embodiments, the image processing server 202 may be included in the computer installed in the kiosk as described for FIG. 1 above. In some embodiments, a same entity (e.g., financial institution or bank) may own and/or operate the image processing server 202 and the corporate server 206.

Figure 4:
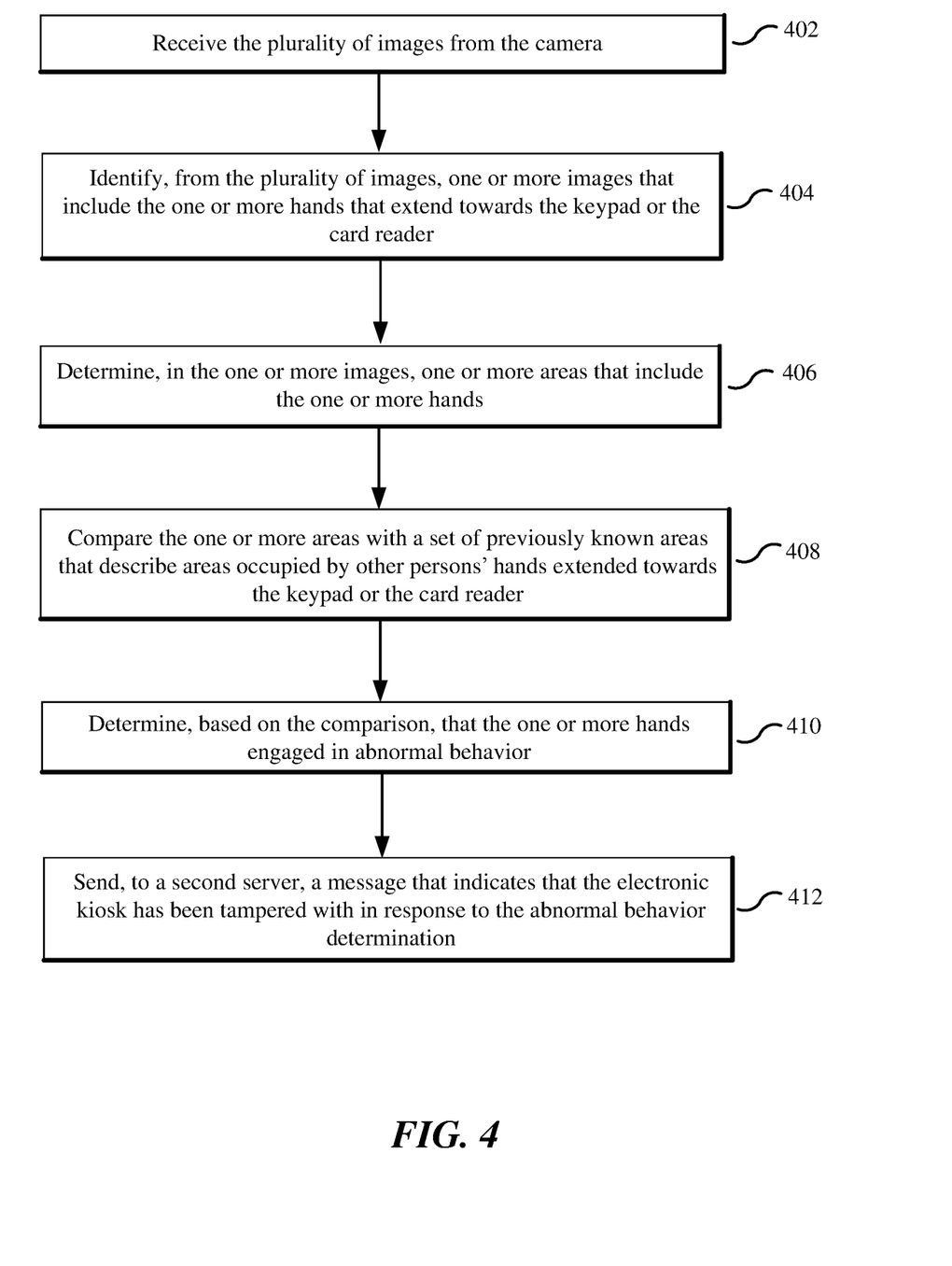
FIG. 4 shows an example flow diagram to determine whether a person located in front of a kiosk is engaging normal or abnormal behavior.

FIG. 4 shows an example flow diagram to determine whether a person located in front of a kiosk is engaging normal or abnormal behavior. At the receiving operation 402, a first server (e.g., an image processing server) can receive a plurality of images from a camera located on or in an electronic kiosk. The camera is positioned to record images of a person located in an area in front of the electronic kiosk, where the images includes one or more hands of the person that perform an action in front of the electronic kiosk. Some examples of an action performed in front of the electronic kiosk include a passcode being entered using the keypad, an electronic card being inserted using the card reader, cash withdrawal, cash or check deposit, or installation of an unauthorized device on the electronic kiosk. The electronic kiosk can include an automated teller machine (ATM) or a gas station fuel dispenser.

At the identifying operation 404, the first server identifies, from the plurality of images, one or more images that include the one or more hands that extend towards the keypad or the card reader. At the determining operation 406, the first server determines, in the one or more images, one or more areas that include the one or more hands.

At the comparing operation 408, the first server compares the one or more areas with a set of images of or information about previously known areas that describe areas occupied by other persons' hands extended towards the keypad or the card reader. The set of previously known areas are associated with normal behavior.

At the determining operation 410, the first server determines, based on the comparison, that the one or more hands engaged in abnormal behavior. For example, the first server determines that the one or more hands are engaged in abnormal behavior by determining, based on the comparison, that at least one hand of the person extends towards the keypad or the card reader for more than a pre-determined number of images or more than a pre-determined length of time. In another example, the first server determines that the one or more hands are engaged in abnormal behavior by determining, based on the comparison, that the one or more hands of the person moves in a pattern dissimilar from a set of patterns obtained from the set of previously known areas.

In some embodiments, if the first server determines, based on the comparison, that the one or more hands engaged in abnormal behavior, then the first server is further configured to determine, based on a comparison of an image from the plurality of images and a previously stored image of the electronic kiosk, that an unauthorized device is installed or placed on or in the electronic kiosk.

At the sending operation 412, the first server generates and sends, to a second server, a message that indicates that the electronic kiosk has been tampered with in response to the abnormal behavior determination.

The second server can be configured to perform a safety measure in response to receiving the message. In some embodiments, the safety measure includes sending a second message to the electronic kiosk to prevent additional transactions with the electronic kiosk or sending to a computer a third message that informs another person to inspect the electronic kiosk. In some embodiments, the first server is further configured to determine, based on the comparison, that the one or more hands are engaged in normal behavior.

Figure 5:
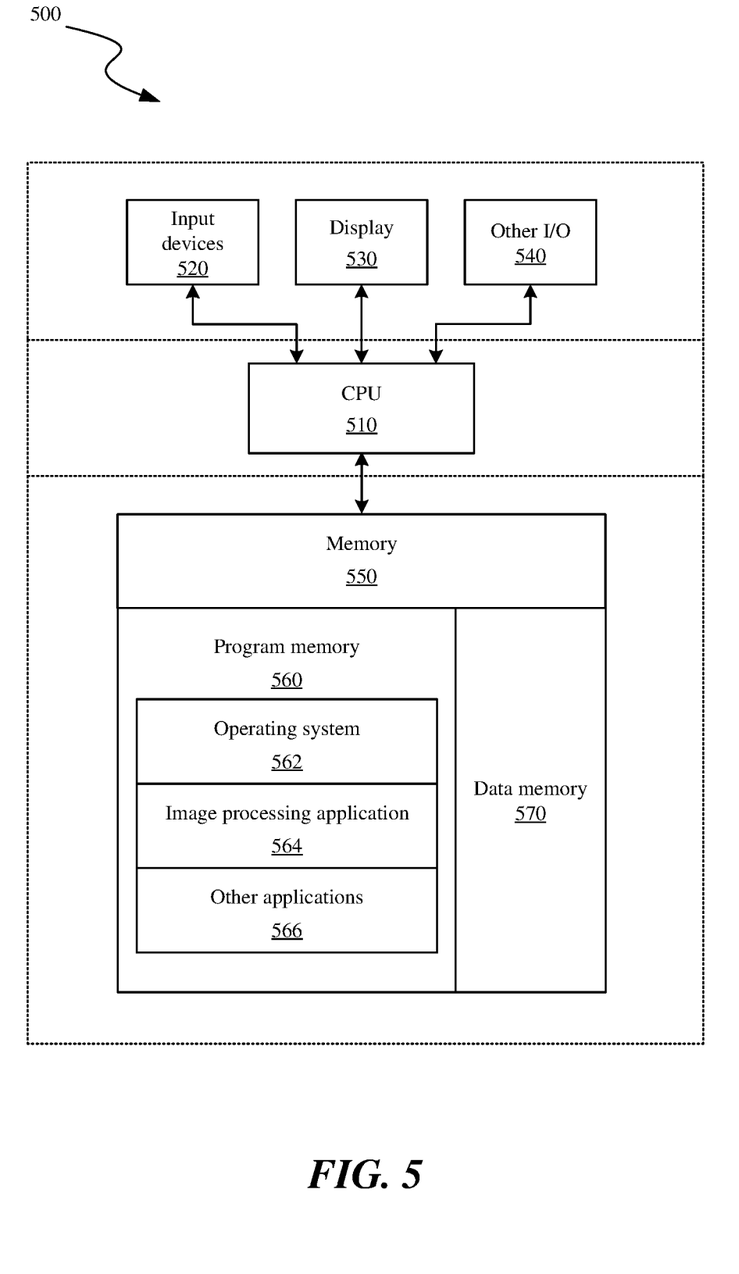
FIG. 5 is a block diagram illustrating an overview of devices on which some implementations of the disclosed technology can operate.

FIG. 5 is a block diagram illustrating an overview of devices on which some implementations of the disclosed technology can operate. The devices can comprise hardware components of a device 500, such as an image processing server or a corporate server, that performs image processing on images obtained from a kiosk camera and that sends instructions to the kiosk to prevent further transactions to protect from theft. Device 500 can include one or more input devices 520 that provide input to the CPU (processor) 510, notifying it of actions. The actions are typically mediated by a hardware controller that interprets the signals received from the input device and communicates the information to the CPU 510 using a communication protocol. Input devices 520 include, for example, a mouse, a keyboard, a touchscreen, an infrared sensor, a touchpad, a wearable input device, a camera- or image-based input device, a microphone, or other user input devices.

CPU 510 can be a single processing unit or multiple processing units in a device or distributed across multiple devices. CPU 510 can be coupled to other hardware devices, for example, with the use of a bus, such as a PCI bus or SCSI bus. The CPU 510 can communicate with a hardware controller for devices, such as for a display 530. Display 530 can be used to display text and graphics. In some examples, display 530 provides graphical and textual visual feedback to a user. In some implementations, display 530 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 840 can also be coupled to the processor, such as a network card, video card, audio card, USB, FireWire or other external device, camera, printer, speakers, CD-ROM drive, DVD drive, disk drive, or Blu-Ray device.

In some implementations, the device 500 also includes a communication device capable of communicating wirelessly or wire-based with a network node. The communication device can communicate with another device or a server through a network using, for example, TCP/IP protocols. Device 500 can utilize the communication device to distribute operations across multiple network devices.

The CPU 510 can have access to a memory 550. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 550 can include program memory 560 that stores programs and software, such as an image processing application 564, and/or other application programs 566 (e.g., the kiosk instructions sent by the corporate server). Thus, for example, the memory 550 may store instructions that upon execution by CPU 510 configure the device 500 to perform the operations described in FIG. 4 and/or in the various embodiments described in this patent document. Memory 550 can also include data memory 570 that can include set of previously known areas that describe areas occupied by other persons' hands extended towards the keypad or the card reader, or set of movement patterns obtained from the set of previously known areas occupied by other persons' hands extended towards the keypad or the card reader, or a normal or average length of time or number of images that persons extend hands toward the kiosk, etc., which can be provided to the program memory 560 or any element of the device 500.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 6:
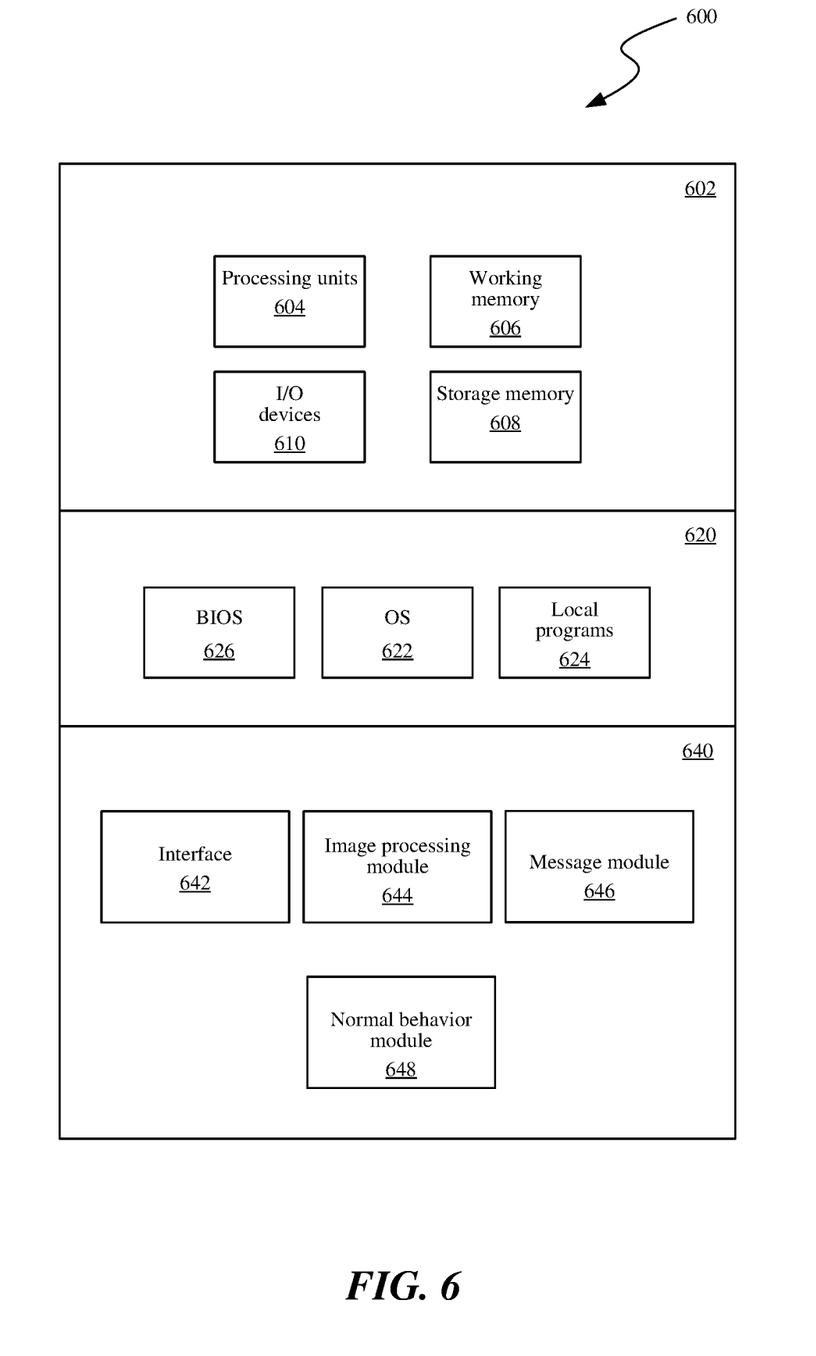
FIG. 6 is a block diagram illustrating components which, in some implementations, can be used in a system employing the disclosed technology.

FIG. 6 is a block diagram illustrating components 600 which, in some implementations, can be used in a system employing the disclosed technology. The components 600 include hardware 602, general software 620, and specialized components 640. As discussed above, a system implementing the disclosed technology can use various hardware, including processing units 604 (e.g., CPUs, GPUs, APUs, etc.), working memory 606, storage memory 608, and input and output devices 610. Some or all of the components 600 can be implemented on a server computing device, such as an image processing server or corporate server described in FIG. 2. For example, a memory may store instructions that upon execution by the processing units 604 configure the image processing server to perform the operations described in FIGS. 2 and 4, and/or in the various embodiments described in this patent document.

General software 620 can include various applications, including an operating system 622, local programs 624, and a basic input output system (BIOS) 626. Specialized components 640 can be subcomponents of a general software application 620, such as local programs 624. Specialized components 640 can include any one or more of image processing module 644 that can perform the image processing operations described in FIGS. 2 and 4, message module 646 that can generate and send a message to inform a corporate server of a detected abnormal activity, and components that can be used for transferring data and controlling the specialized components, such as interface 642. The image processing module 644 can determine whether a person's action in front of a kiosk is normal or abnormal by obtaining information related to set of previously known areas that describe areas occupied by other persons' hands extended towards the keypad or the card reader, where the previously known areas occupied by the other persons' hands are considered normal behavior. The normal behavior module 648 can perform machine learning to determine areas occupied by other persons' hands that are considered normal behavior, or to determine a set of movement patterns by the other persons' hands that are considered normal behavior. In some implementations, components 600 can be in a computing system that is distributed across multiple computing devices or can be an interface to a server-based application executing one or more of specialized components 640.

Those skilled in the art will appreciate that the components illustrated in FIG. 5-6 described above, and in each of the flow diagrams, may be altered in a variety of ways. For example, the order of the logic may be rearranged, substeps may be performed in parallel, illustrated logic may be omitted, other logic may be included, etc. In some implementations, one or more of the components described above can execute one or more of the processes described above.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Several implementations of the disclosed technology are described above in reference to the figures. The computing devices on which the described technology may be implemented can include one or more central processing units, memory, input devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology.

In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A system, comprising:
   an electronic kiosk, comprising:
      a display,
      a keypad,
      a card reader,
      a camera positioned to record a plurality of images of a person located in an area in front of the electronic kiosk, wherein the plurality of images includes one or more hands of the person that perform an action in front of the electronic kiosk;
   a first server configured to:
      receive the plurality of images from the camera;
      initiate, by a behavior analysis machine-learning platform trained using images of normal and abnormal behavior at kiosks, an abnormal behavior determination process including:
         identify, by at least one processor of the first server, from the plurality of images, one or more images that include the one or more hands that extend towards the keypad or the card reader;
         determine, by the at least one processor of the first server, in the one or more images, one or more areas that include the one or more hands;
         compare, by the at least one processor of the first server, the one or more areas with a set of images of previously known areas that describe areas occupied by other persons' hands extended towards the keypad or the card reader, wherein the set of images of previously known areas are associated with normal behavior for the electronic kiosk;
         determine, by the at least one processor of the first server, based on the comparison, that the one or more hands are engaged in abnormal behavior associated with an unauthorized device being installed or placed on or in the electronic kiosk; and
      send, to a second server, a message that indicates that the electronic kiosk has been tampered with in response to the abnormal behavior determination; and
   the second server configured to:
      perform a safety measure in response to receiving the message.

2. The system of claim 1, wherein the first server is configured to determine that the one or more hands engaged in abnormal behavior by determining, based on the comparison, that at least one hand of the person extends towards the keypad or the card reader for more than a pre-determined number of images or more than a pre-determined length of time.

3. The system of claim 1, wherein the first server is configured to determine that the one or more hands engaged in abnormal behavior by determining, based on the comparison, that the one or more hands of the person moves in a pattern dissimilar from a set of patterns obtained from the set of previously known areas.

4. The system of claim 1, the first server is further configured to:
   determine, using a first image from the plurality of images, a first area around the card reader;
   determine, using a second image from the plurality of images, a second area around the card reader; and
   send, to the second server, a second message that indicates that the electronic kiosk has been tampered with in response to determining that the second area is different from the first area.

5. The system of claim 1, the first server is further configured to:
   determine, using a first image from the plurality of images, a first set of points that describe a first area around the card reader;
   determine, using a second image from the plurality of images, a second set of points that describe a second area around the card reader;
   obtain a number of points that differ between by the first and second sets of points by comparing points from the first set of points to corresponding points from the second set of points; and
   send, to the second server, a second message that indicates that the electronic kiosk has been tampered with in response to determining that the number of points is greater than a pre-determined value.

6. The system of claim 1, the first server is further configured to:
   determine, using a first image from the plurality of images, a first set of points that describe a first area around the card reader;
   obtain a first set of distances by comparing at least some of the first set of points to a pre-determined reference point;
   determine, using a second image from the plurality of images, a second set of points that describe a second area around the card reader;
   obtain a second set of distances by comparing at least some of the second set of points to the pre-determined reference point, wherein the second set of points correspond to the first set of points; and
   send, to the second server, a second message that indicates that the electronic kiosk has been tampered with in response to determining that at least one distance from the first set of distances is different from at least one distance from the second set of distances.

7. The system of claim 1, wherein the safety measure includes
   sending a second message to the electronic kiosk to prevent additional transactions with the electronic kiosk, or
   sending to a computer a third message that informs another person to inspect the electronic kiosk.

8. The system of claim 1, wherein the first server is further configured to:
   analyze activity in the plurality of images;
   determine, in the plurality of images, the one or more areas that include the one or more hands;
   comparing the one or more areas with the set of images of previously known areas that describe areas occupied by other persons' hands extended towards the keypad or the card reader,
      wherein the set of images of previously known areas are associated with normal behavior for the electronic kiosk;

determine, based on the comparison and the activity in the plurality of images, that the one or more hands are engaged in normal behavior.

9. The system of claim 1, wherein the electronic kiosk includes an automated teller machine (ATM) or a gas station fuel dispenser.

10. The system of claim 1, wherein the action includes a passcode being entered using the keypad, an electronic card being inserted using the card reader, cash withdrawal, cash or check deposit, or installation of the unauthorized device on the electronic kiosk.

11. A method, comprising:
receiving a plurality of images from a camera;
initiating, by a behavior analysis machine-learning platform trained using images of normal and abnormal behavior at kiosks, an abnormal behavior determination process including:
identifying, by at least one processor of a first server, from the plurality of images, one or more images that include one or more hands of the person that extend towards a keypad or a card reader on an electronic kiosk to perform an action;
determining, by the at least one processor of the first server, in the one or more images, one or more areas that include the one or more hands;
comparing, by the at least one processor of the first server, the one or more areas with a set of images of previously known areas that describe areas occupied by other persons' hands extended towards the keypad or the card reader, wherein the set of images of previously known areas are associated with normal behavior for the electronic kiosk;
determining, by the at least one processor of the first server, based on the comparison, that the one or more hands are engaged in abnormal behavior associated with an unauthorized device being installed or placed on or in the electronic kiosk; and
sending, to a second server, a message that indicates that the electronic kiosk has been tampered with in response to the abnormal behavior determination, wherein the server performs a safety measure in response to the sent message.

12. The method of claim 11, wherein the one or more hands are determined to engage in abnormal behavior by determining, based on the comparison, that at least one hand of the person extends towards the keypad or the card reader for more than a pre-determined number of images or more than a pre-determined length of time.

13. The method of claim 11, wherein the one or more hands are determined to engage in abnormal behavior by determining, based on the comparison, that the one or more hands of the person moves in a pattern dissimilar from a set of patterns obtained from the set of previously known areas.

14. The method of claim 11, further comprising:
determine, using a first image from the plurality of images, a first area around the card reader;
determine, using a second image from the plurality of images, a second area around the card reader; and
send, to the server, a second message that indicates that the electronic kiosk has been tampered with in response to determining that the second area is different from the first area.

15. The method of claim 11, further comprising:
determine, using a first image from the plurality of images, a first set of points that describe a first area around the card reader;
determine, using a second image from the plurality of images, a second set of points that describe a second area around the card reader;
obtain a number of points that differ between by the first and second sets of points by comparing points from the first set of points to corresponding points from the second set of points; and
send, to the server, a second message that indicates that the electronic kiosk has been tampered with in response to determining that the number of points is greater than a pre-determined value.

16. The method of claim 11, further comprising:
determine, using a first image from the plurality of images, a first set of points that describe a first area around the card reader;
obtain a first set of distances by comparing at least some of the first set of points to a pre-determined reference point;
determine, using a second image from the plurality of images, a second set of points that describe a second area around the card reader;
obtain a second set of distances by comparing at least some of the second set of points to the pre-determined reference point, wherein the second set of points correspond to the first set of points; and
send, to the server, a second message that indicates that the electronic kiosk has been tampered with in response to determining that at least one distance from the first set of distances is different from at least one distance from the second set of distances.

17. The method of claim 11, wherein the safety measure includes:
receiving by the electronic kiosk a second message to prevent additional transactions with the electronic kiosk, or
sending to a computer a third message that informs another person to inspect the electronic kiosk.

18. The method of claim 11, further comprising:
establishing a pattern of times in which a likelihood of criminal activity is higher than a threshold; and
setting a lower threshold for determining abnormal activity during the times that the likelihood of criminal activity exceeds the threshold; and
allocating data storage space for the times in which the likelihood of criminal activity is higher than the threshold.

* * * * *